United States Patent [19]

Reynolds et al.

[11] 3,993,556

[45] Nov. 23, 1976

[54] METHOD OF CATALYTIC CRACKING OF HYDROCARBONS

[75] Inventors: David L. Reynolds, Nederland; Douglas J. Youngblood, Groves, both of Tex.

[73] Assignee: Texaco Inc., New York, N.Y.

[22] Filed: Nov. 25, 1974

[21] Appl. No.: 526,868

Related U.S. Application Data

[63] Continuation of Ser. No. 313,714, Dec. 11, 1972, abandoned, which is a continuation of Ser. No. 889,494, Dec. 31, 1969, abandoned.

[52] U.S. Cl. .................. 208/75; 208/80; 208/120; 208/155; 208/164
[51] Int. Cl.² ............... B01J 8/24; C10G 11/04
[58] Field of Search ............. 208/120, 75, 80, 155, 208/164

[56] References Cited
UNITED STATES PATENTS

| | | | |
|---|---|---|---|
| 2,710,279 | 6/1955 | Siecke | 208/155 |
| 3,188,184 | 6/1965 | Rice et al. | 23/288 |
| 3,188,185 | 6/1965 | Slyngstad et al. | 23/288 |
| 3,355,380 | 11/1967 | Luckenbach | 208/153 |
| 3,433,733 | 3/1969 | Bunn et al. | 208/150 |
| 3,448,037 | 6/1969 | Bunn et al. | 208/164 |
| 3,617,496 | 11/1971 | Bryson et al. | 208/80 |
| 3,647,714 | 3/1972 | White | 252/417 |
| 3,650,946 | 3/1972 | Mourning | 208/120 |

*Primary Examiner*—Delbert E. Gantz
*Assistant Examiner*—G. E. Schmitkons
*Attorney, Agent, or Firm*—T. H. Whaley; C. G. Ries; William E. McNulty

[57] ABSTRACT

In a fluid catalytic cracking unit utilizing a zeolite cracking catalyst and employing a multiplicity of elongated reaction zones or risers, significant improvements are obtained by introducing a light gas oil to at least one elongated reaction zone and a heavier gas oil to at least one other elongated reaction zone. Optionally, the vaporous effluent from either or both elongated reaction zones may be subjected to further cracking in the dense phase of catalyst in the reactor vessel. Operating conditions within the elongated reaction zones are established to permit the conversion of the heavier gas oil to be 0–30 volume percent lower than the light gas oil. Higher yields of higher octane gasoline are obtained where the unit is operated in the disclosed manner.

11 Claims, 1 Drawing Figure

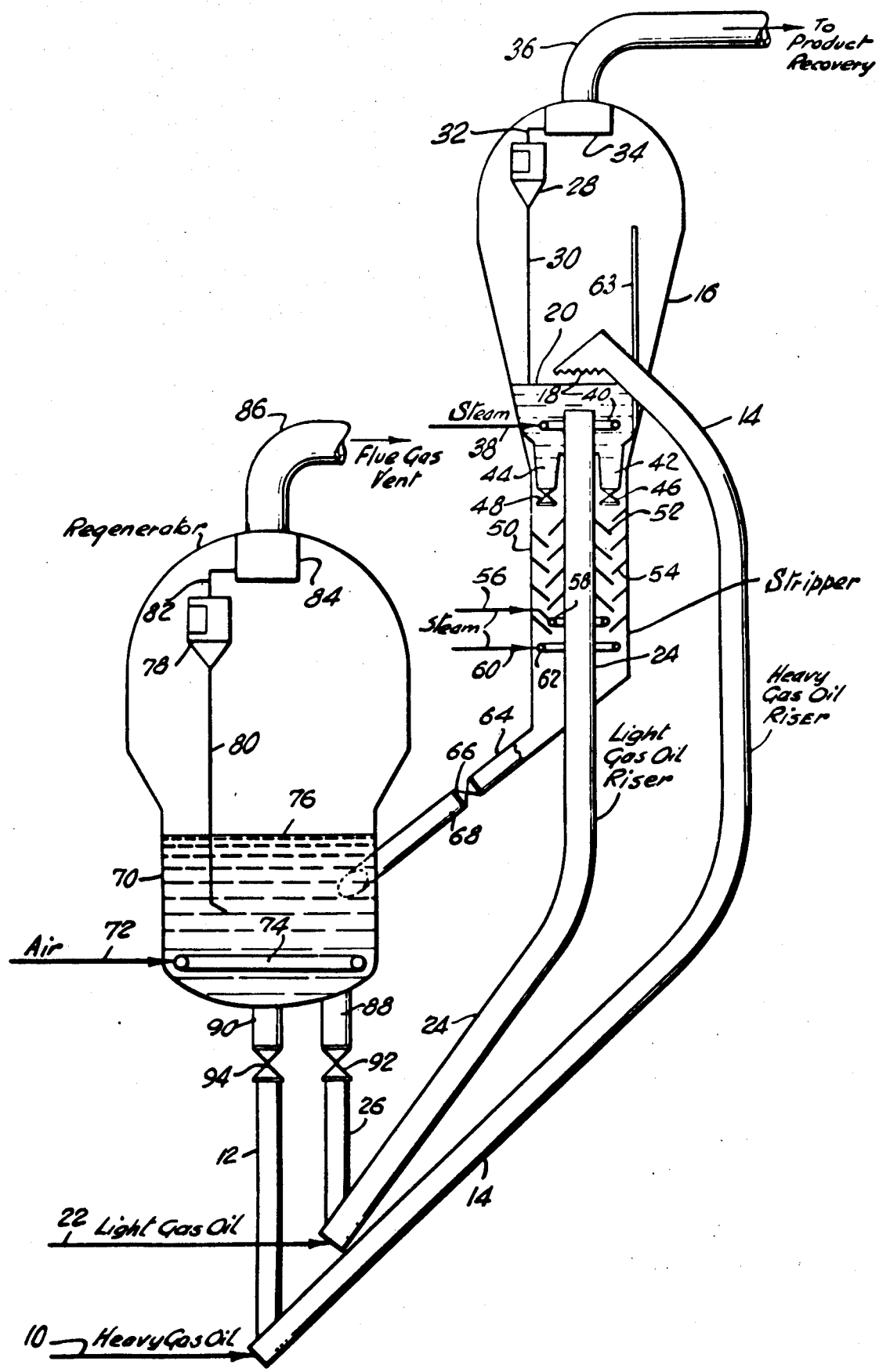

3,993,556

METHOD OF CATALYTIC CRACKING OF HYDROCARBONS

CROSS-REFERENCES TO RELATES APPLICATIONS

This is a continuation of application Ser. No. 313,714, filed Dec. 11, 1972, which is a continuation of application Ser. No. 889,484, filed Dec. 31, 1969, both now abandoned.

BACKGROUND OF THE INVENTION

This invention relates to an improved method for the fluid catalytic cracking of hydrocarbon oils. In particular, this invention relates to the fluid catalytic cracking of petroleum feed stocks. More particularly, it is related to a method of operating a fluid catalytic cracking unit (FCCU) having a multiplicity of elongated reaction zones, also described herein as risers, in order to obtain higher yields of naphtha at higher octane ratings than obtained heretofore.

In the fluid catalytic cracking process, hydrocarbons are converted under conditions such that substantial portions of a hydrocarbon feed are transformed into desirable products such as gaoline, liquified petroleum gas, alkylation feed stocks and middle distillate blending stocks with concomitant by-product formation of an undesirable nature, such as, gas and coke. When substantial amounts of coke deposition occur, reduction in catalyst activity and, particularly, catalyst selectivity results thereby detering hydrocarbon conversion, reducing gasoline production and simultaneously increasing the production of less desired products. To overcome such catalyst deactivation through coke deposition, the catalyst is normally withdrawn from the reaction zone and passed to a stripping zone wherein entrained and adsorbed hydrocarbons are initially displaced from the catalyst by means of a stripping medium such as steam. The steam and hydrocarbons are removed and the stripped catalyst is passed to a regeneration zone where it is contacted with an oxygen-containing gas to effect combustion of at least a portion of the coke and regeneration of the catalyst. Thereafter, the regenerated catalyst is reintroduced to the reaction zone and therein contacted with additional hydrocarbons.

Recently there have been significant improvements in the catalytic cracking process. The introduction of zeolitic cracking catalysts has resulted in increased throughput and improved product quality from existing catalytic cracking units. In addition, improved catalytic cracking apparatus has been developed specifically for use with these improved catalysts which has further enhanced the overall process. For example, U.S. Pat. Nos. 3,433,733 and 3,448,037 are directed to the fluid catalytic cracking of petroleum hydrocarbons with zeolitic cracking catalysts and disclose operating parameters and techniques particularly directed to these new catalysts, as well as fluid catalytic cracking apparatus designed to take advantage of the desirable characteristics of the zeolitic catalysts. More particularly, the apparatus incorporates the concept of "riser cracking" wherein gas oil feedstocks and cycle stocks are individually cracked in separate elongated reaction zones or risers terminating in a tapered reaction chamber containing a dense phase and a dilute phase of catalyst wherein further cracking takes place in the fluidized dense phase. With riser cracking it is possible to select operating conditions specifically suited to the particular feed, gas oil or recycle stocks, being introduced into each riser. In addition, the cracking apparatus incorporates a stripping section beneath the fluidized dense bed wherein entrained and adsorbed hydrocarbons are displaced from the catalyst by means of steam before the catalyst passes to the regenerator vessel. As with conventional fluid catalytic equipment the catalyst is contacted with an oxygen-containing gas in the regenerator to effect combustion of at least a portion of the deposited coke. The regenerated catalyst is then reintroduced into the bottom of the elongated reaction zones or risers at a point where the feedstocks are introduced. Through the use of multiple risers it is possible to operate the individual risers under conditions providing maximum recovery of desired products with minimal formation of undesired materials at the maximum possible yields. Usually, the more refractory stocks, such as the cycle gas oils, will be passed through the riser operating at a higher temperature than the riser which is processing the fresh gas oil. The overall effect, of course, is to achieve optimum performance of both the fluid catalytic cracking unit and the zeolitic cracking catalyst.

Although the prior art patents have disclosed apparatus and operating procedures which take advantage of the unique properties of the zeolitic cracking catalyst, any other operating improvements which will further enchance the performance of the apparatus or the quality and/or quantity of the products are highly desirable.

SUMMARY OF THE INVENTION

Broadly, our invention is directed to an improved method of operating a fluid catalytic cracking unit wherein substantially all or most of the cracking takes place in a multiplicity of elongated reaction zones or risers. Higher naphtha yields at higher octane ratings are achieved by introducing a gas oil having a low boiling range into at least one riser and a gas oil having a higher boiling range into at least one other riser. The operating conditions in the risers are selected to achieve a conversion of the higher boiling gas oil 0–30 volume percent lower than the lower boiling gas oil. In a preferred configuration an FCCU with two risers is employed.

BRIEF DESCRIPTION OF THE DRAWING

The present invention will be more readily understood by reference to the accompanying drawing, FIG. 1, which illustrates and exemplifies an apparatus by which the process of the present invention may be practiced.

DESCRIPTION OF THE PREFERRED EMBODIMENTS

Broadly, we have found that significant improvements in the operation of a fluid catalytic cracking unit employing a multiplicity of elongated reaction zones can be obtained by introducing a gas oil having a low boiling range into at least one of the elongated reaction zones and introducing a gas oil having a higher boiling range into at least one other elongated reaction zone. For convenience these gas oils will also be referred to herein as light gas oil and heavy gas oil, lighter gas oil and heavier gas oil or lower boiling gas oil and higher boiling gas oil, respectively. Operating conditions within the several elongated reaction zones are established to permit the conversion of the heavy gas oil to be 0–30 volume percent lower than the light gas oil. By operating in this fashion it is possible to obtain higher yields of higher octane gasoline than obtained heretofore by conventional methods of operation in similar equipment.

Our invention contemplates in a process for the catalytic cracking of a multiplicity of virgin gas oils with a zeolite cracking catalyst in a fluid catalytic cracking unit comprising a reactor, a regenerator and a multiplicity of elongated reaction zones wherein said reactor contains a dense phase and a dilute phase of said catalyst and said elongated reaction zones terminate at said reactor and wherein admixtures of said gas oil and said catalyst are passed through said elongated reaction zones under catalytic cracking conditions to said reactor, the improvement which comprises:

a. passing through at least one elongated reaction zone a virgin gas oil having a higher boiling range than the virgin gas oil passing through at least one other elongated reaction zone, and b. discharging the effluent from said elongated reaction zones into a catalyst phase in said reactor, said effluent comprising vaporous reaction mixture and catalyst, the conversion of the higher boiling gas oil being 0–30 volume percent lower than of the lower boiling gas oil.

Further, in the simplest embodiment of this invention, an FCCU with two risers is employed with the operating conditions in the risers including a temperature of 800°–1150° F., conversion of 30–80 volume percent and space velocities in the light gas oil riser and the heavy gas oil riser being 10–100 w/hr/w and 50–200 w/hr/w, respectively.

Both riser cracking and fluidized dense phase cracking of the several gas oils may be employed in this process leading to a variety of optional embodiments. Although the possibilities may be obvious to those skilled in the art a number of variations will be described briefly in a process employing a two riser FCCU.

In one embodiment the cracking of the light gas oil and the heavy gas oil is restricted to the risers by discharging the effluent from both risers into the dilute phase of catalyst in the reactor vessel. The reactor vessel in this case is utilized as a disengaging space with substantially no cracking taking place therein.

In another embodiment, the light gas oil is subjected to both riser and dense phase cracking while the cracking of the heavy gas oil is limited to its riser. The effluent from the heavy gas oil riser is discharged into the dilute phase of catalyst, the effluent from the light gas oil riser is discharged into the dense phase of catalyst and the vaporous reaction mixture from the light gas oil riser is passed through the dense phase of catalyst under catalytic cracking conditions effecting an additional conversion of 5–30 volume percent with the total per pass conversion of the light gas oil not exceeding 80 volume percent. By adjusting the operating conditions, the conversion in the light gas oil riser may be lower, equal to or higher than that in the heavy gas oil riser.

In a further embodiment, the light gas oil is subjected only to riser cracking while the heavy gas oil is cracked in both the riser and the dense phase of catalyst. The effluent from the light gas oil riser is discharged directly into the dilute phase of catalyst in the reactor vessel, while the effluent from the heavy gas oil riser is discharged into the dense phase of catalyst and passed through this dense phase under catalytic cracking conditions effecting an additional conversion of 5–30 volume percent. The per pass conversion of the heavy gas oil does not exceed 80 volume percent.

In another embodiment, both the light gas oil and the heavy gas oil are subjected to both riser cracking and dense phase bed cracking by discharging the effluent from both risers into the dense phase of catalyst and passing them therethrough under catalytic cracking conditions to effect an additional conversion of 5–30 percent. In this embodiment the total conversion of all gas oils passing through the catalytic cracking unit does not exceed 80 volume percent.

In accordance with this invention the fresh feed comprises gas oil type stocks. Among these stocks which may be usefully employed in the process of our invention are those petroleum fractions boiling from about 430° to 1050° F. comprising heavy atmospheric gas oil, light and heavy vacuum gas oils, visbroken gas oil, deasphalted gas oil, decarbonized gas oil, hydrotreated gas oil and solvent extracted gas oil. All of these feed stocks are virgin petroleum stocks whose processing has not previously included fluid catalytic cracking.

In general the gas oil feeds employed in the process of our invention have a boiling range between 430° and 1050° F. Generally, we prefer to employ as the lighter gas oil a gas oil having a boiling range of about 430° to 750° F., while the heavier gas oil may have a boiling range of about 600° to 1050° F. The two gas oil feeds may be obtained by fractionating whole gas oil or crude oil or may be obtained from separate sources. In the latter case, of course, the boiling ranges of the two fractions may overlap or not. It is preferred however, to fractionate the whole gas oil to obtain the maximum benefits from the process of our invention. In that case we would prefer that the lighter gas oil have a boiling range of about 430° to 750° F and the heavier gas oil a boiling range of about 700° to 1050° F. The operable boiling ranges will mean that between 20 and 80 volume percent, preferably 40 to 60 volume percent of the gas oil would comprise the lighter gas oil portion.

Although it is anticipated that the gas oil feed to the catalytic cracking unit will be initially fractionated into a light fraction and a heavy fraction, our process may be operated merely by employing a light gas oil and a heavier gas oil with either a boiling point gap or overlap between the end point of the lighter gas oil and the initial boiling point of the heavier gas oil. Where the entire gas oil charge to the fluid catalytic cracking unit is to be fractionated to prepare the two charge stocks several fractionating techniques may be employed. Where the gas oil is supplied directly from the crude fractionator, it is possible to split the feed on the crude fractionator to produce the light gas oil and the heavy gas oil which can pass directly to the fluid catalytic cracking unit. Where feed streams are composited before charging to the fluid catalytic cracking unit, a pre-fractionator may be employed to split the charge into lower boiling and higher boiling constituents followed by charging these fractions to their respective risers. In a grass roots design, it may be possible to design the fractionator to handle not only the vaporous reaction effluent from the FCCU but also to fractionate the charge to the catalytic cracking unit into the light gas oil and heavy gas oil fractions. In this manner, the gaseous products from the reactor can be combined with the catalytic cracking unit fresh feed and introduced to the fractionator wherein the upper portion thereof would be employed to separate the light ends, gasoline and middle distillates while the lower portion of the fractionator would produce the lower and higher boiling gas oil fractions for subsequent charging to the fluid catalytic cracking unit risers.

The catalyst employed in the instant invention comprises a large pore crystalline aluminosilicate customarily referred to as a zeolite and an active metal oxide, as exemplified by silica-alumina gel or clay. The zeolites employed as cracking catalysts herein possess ordered rigid three-dimensional structures having uniform pore diameters within the range of from about 5 to about 15A. The crystalline zeolitic catalysts employed herein comprise about 1 to 25 wt. % zeolite, about 10 to 50 wt. % alumina and the remainder silica. Among the preferred zeolites are those known as zeolite X and zeolite Y wherein at least a substantial portion of the original alkali metal ions have been replaced with such cations as hydrogen and/or metal or combination of metals such as barium, calcium, magnesium, manganese or such rare earth metals, for example, cerium, lanthanum, neodymium, praseodymium, samarium and yttrium.

As contemplated herein the light gas oil and heavy gas oil and introduced into elongated reaction zones which are operated to effect a lower conversion of the heavier gas oil stream. In its simplest form, a two riser FCCU is employed. The operating conditions for both the light gas oil riser and a heavy gas oil riser include an operating temperature of 800°–1150° F., preferably 840°–1000° F. and a conversion per pass of 30–80 percent, preferably 40–75 percent. Other operating conditions within the risers include a residence time of 2–20 seconds, preferably 3–10 seconds and a vapor velocity of 15–50 ft/sec, preferably 20–40 ft/sec. The space velocity in the light gas oil riser is 10–100 w/hr/w, preferably 40–90 w/hr/w and the space velocity in the heavy gas oil riser is 50–200 w/hr/w, preferably 75–150 w/hr/w. The conversion per pass of the heavy gas oil is 0–30 percent lower than the conversion of the light gas oil with the overall conversion of the light gas oil not exceeding 80 volume percent.

Where the embodiment employed includes additional cracking of either effluent in the dense phase of catalyst in the reactor the operating conditions within the dense phase include a temperature of 800°–1150° F., a vapor velocity of 0.5–4 ft/sec, preferably 1.3–2.2 ft/sec and a space velocity of 1–40 w/hr/w, preferably 3–25 w/hr/w. The vaporous reaction products from a riser which passes through the dense phase of catalyst obtains a further conversion of 5–30 volume percent.

By operating within the parameters of our invention, it is possible to obtain higher naphtha yields at higher octane levels than obtained by other operating techniques.

It may not be possible to employ the process of our invention with all multiple riser catalytic cracking units. One skilled in the art will appreciate that the configuration of the unit under consideration may have to be studied in detail in order to determine if modifications or variations in operating techniques may be employed to utilize the process of this invention. Directionally the conversion of the light gas oil is higher than that of the heavy gas oil and to this end the lighter feed should be passed through a longer riser than is the heavy gas oil. Also, the linear velocity of the light gas oil should be kept at a low level in order to achieve greater contact time within the riser and therefore greater conversion. Employing this invention in existing equipment will require careful study and adjustment of operating conditions and, in some instances, even some equipment modifications.

It is preferred that the catalytic cracking unit be specifically designed to operate under the particular embodiment of this invention which is selected.

The invention may be understood from the following detailed description taken with reference to accompanying FIG. 1, which illustrates and exemplifies an apparatus by which one of the embodiments of the present invention may be practiced. By describing our invention in terms of this apparatus it is not intended to restrict the invention thereby since modification to the illustrated apparatus may be made within the scope of the claims without departing from the spirit thereof.

Referring to FIG. 1, fresh heavy gas oil is introduced through line 10 to riser 14 and fresh light gas oil is introduced through line 22 to riser 24. This fresh feed can be obtained from a variety of sources, not shown. For example, the light gas oil and heavy gas oil may be obtained by the fractionation of a composite gas oil feed or a crude oil. In addition, these two feeds may be obtained from completely separate sources as long as one is a lighter gas oil than the other. The heavy gas oil in line 10, having a boiling range between 550° and 1050° F., is brought into contact with hot regenerated equilibrium molecular sieve zeolite catalyst from standpipe 12; the catalyst being at a temperature of about 1150° F. The resulting suspension of catalyst-in-oil vapor, at a temperature of about 920° F., passes up riser 14 at a vapor velocity of about 30 ft/sec with an average residence time of about 8 seconds and discharges into the dilute phase of catalyst in reactor 16. Riser 14, referred to as the heavy gas oil riser, terminates in a downwardly directed outlet having a serrated edge 18, the purpose of which is to provide smooth flow of hydrocarbon vapors from conduit 14 into the dilute phase of reactor 16 particularly when dense phase level 20 below serrated edge 18 fluctuates nearer the outlet of riser 14 as defined by serrated edge 18. Conditions prevailing in heavy gas oil riser 14 maintain a conversion 5 to 30 % lower than in the light gas oil riser.

The light gas oil having a boiling range between 430° and 750° F. passes through line 22 to light gas oil riser 24 where it is contacted with hot zeolite catalyst described above from standpipe 26. The resulting catalyst-vapor mixture, at a temperature of about 920° F., passes upwardly through light gas oil riser 24 at an average velocity of about 30 ft/sec with an average residence time of about 6 seconds. Other conditions in the light gas oil riser are adjusted to maintain the conversion between 5 and 30% higher than in riser 14.

The effluent from light gas oil riser 24 discharges into the lower portion of the dense phase of catalyst in reactor 16 and passes upwardly through this dense phase of cracking catalyst in reactor 16 effecting further conversion of 10 percent of the gas oil. Other conditions in the dense phase in reactor 16 include a temperature of 920° F. and a weight hourly space velocity of 6 w/hr/w. The combined heavy gas oil riser cracking, light gas oil riser cracking and reactor bed cracking provide an overall conversion of 57 volume percent wherein conversion is defined as 100 minus the volume percent of products boiling above 430° F. The vapor velocities in the reactor are 1.5 ft/sec at the point where the light gas oil riser discharges into the dense phase, 1.2 ft/sec at the point of vapor disengagement from the dense phase at level 20, 2.5 ft/sec at the point where the heavy gas oil riser discharges into the dilute phase and 2 ft/sec at the upper portion of the cyclone inlets.

Cracked products disengage from the catalyst in the dilute phase above dense phase level 20. The vapors together with any entrained catalyst pass through cyclone 28 wherein the catalyst is separated and returned to the bed through dip leg 30. Effluent gases pass from cyclone 28 through line 32 to plenum chamber 34 wherein the gases from additional cyclone assemblies, not shown, are collected and discharged from the reactor through line 36. Vapor line 36 conveys the cracked products to product recovery facilities, not shown, wherein the products are recovered and separated into desired products by compression, absorption and/or distillation facilities well known in the art.

Steam is passed through line 38 to steam ring 40 and discharges into the lower portion of reaction 16 at a point below the outlet of light gas oil riser 24. Dense phase catalyst in the lower portion of reaction 16 is stripped by the steam from ring 40 and passes downwardly through standpipes 42 and 44 and slide valves 46 and 48 into stripping zone 50. Stripping zone 50 is provided with baffles 52 attached to riser 24 and baffles 54 attached to the wall of stripper 50. Steam is discharged through line 56 and steam ring 58 into the lower portion of stripper zone 50 under baffles 52 and through line 60 and steam ring 62 under baffles 54. Steam rising through the stripper displaces and removes adsorbed and entrained hydrocarbon vapors which pass upwardly through stripper vent line 63 discharging into the dilute phase of reactor 16 where they are recovered together with the cracked products as described above.

Stripped catalyst is withdrawn from the bottom of stripping zone 50 through spent catalyst standpipe 64 at a rate controlled by slide valve 66 and discharges through standpipe 68 into regenerator 70. The spent catalyst is contacted in regenerator 70 with air introduced through line 72 and air ring 74. The catalyst undergoing regeneration forms a dense phase in the regenerator having a top level 76. Carbon on the surface of the catalyst is burned and the resulting flue gas passes upwardly through regenerator 70 and enters cyclone 78 wherein entrained catalyst is separated and returned to the regenerator dense bed through dip leg 80. Effluent flue gas from cyclone 78 passes through line 82 into plenum chamber 84 and outwardly through flue gas line 86 to vent facilities, not shown, which may include means to recover heat and energy from the flue gases as is well known in the art. Regenerated catalyst is withdrawn from the bottom of regenerator 70 through lines 88 and 90 at rates controlled by slide valves 92 and 94 to supply the hot regenerated catalysts to standpipes 12 and 26 as described above.

The following exemplifies the practice of our invention in a series of operations of a continuous fluidized bed catalytic cracking unit. For simplicity no recycle is employed in any of the runs. The cracking is restricted to the risers, no dense phase cracking is employed.

In both cases of this example the process of our invention is demonstrated with a fluid catalytic cracking unit employing the two riser concept and is compared with a conventional fluid catalytic cracking unit having a single riser and processing whole gas oil. In Case A both the single riser and the dual riser units are operated with about the same overall conversion while the heavy gas oil in the dual riser run is cracked at a lower percent conversion than the light gas oil. In Case B, both the single riser unit and the dual riser unit are operated at the same conversion and in addition, the light gas oil and heavy gas oil are cracked at the same conversion in the dual riser unit.

Table I, below, sets forth the properties of the whole gas oil employed in the single riser runs and the light gas oil and heavy gas oil used in the dual riser runs which have been obtained by fractionating this whole gas oil

TABLE I

| FEEDSTOCK PROPERTIES | | | |
|---|---|---|---|
|  | Whole Gas Oil | Light Gas Oil | Heavy Gas Oil |
| Gravity, ° API | 30.9 | 34.7 | 27.3 |
| 10 mm. Vacuum Distillation, ° F.* | | | |
| IB | 403 | 423 | 579 |
| 10 | 510 | 489 | 630 |
| 30 | 577 | 531 | 662 |
| 50 | 632 | 560 | 695 |
| 90 | 767 | 646 | 803 |
| EP | 840 | 690 | 850 |
| Vol.% of Whole Gas Oil | — | 50 | 50 |

*Atmospheric equivalent temperatures

The pertinent operating conditions, the conversion and yields obtained together with octane ratings of the naphtha for the several cases and runs are set forth in Table II below. The dual riser cases are embodiments of the present invention.

TABLE II

| | Case A | | | Case B | | |
|---|---|---|---|---|---|---|
| | Single Riser | Dual Riser | Delta Yield (Dual-Single) | Single Riser | Dual Riser | Delta Yield (Dual-Single) |
| Riser Temp., ° F | | | | | | |
| Riser 1 | 920 | 920 | | 920 | 920 | |
| Riser 2 | | 920 | | | 920 | |
| Conversion, Vol. % | | | | | | |
| Riser 1, Light Gas Oil | | 61 | | | 66 | |
| Riser 2, Heavy Gas Oil | | 52 | | | 66 | |
| Whole Feed | 58 | | | 66 | | |
| Overall Conversion | 58 | 56.5 | | 66 | 66 | |
| Yields, wt. % | | | | | | |
| Coke | 5.0 | 4.8 | −0.2 | 5.9 | 5.1 | −0.8 |
| Dry Gas | 4.4 | 3.5 | −0.9 | 5.7 | 5.8 | +0.1 |
| Butanes | 9.8 | 8.4 | −1.4 | 10.8 | 10.3 | −0.5 |
| DB Naphtha(1) | 37.4 | 38.0 | +0.6 | 42.4 | 44.2 | +1.8 |
| Gas Oil | 43.4 | 45.3 | +1.9 | 35.2 | 34.6 | −0.6 |
| DB Naphtha Octane | | | | | | |

TABLE II-continued

| | Case A | | | Case B | | |
|---|---|---|---|---|---|---|
| | Single Riser | Dual Riser | Delta Yield (Dual-Single) | Single Riser | Dual Riser | Delta Yield (Dual-Single) |
| (RON with 3 cc TEL)(2) | 97.7 | 98.1 | +0.4 | 99.0 | 99.7 | +0.7 |

(1)Debutanized naphtha
(2)Research octane number of naphtha containing 3 cc. of tetraethyllead per gallon From a study of Table II, it is seen that higher naphtha yields at higher octane ratings are obtained in each of the dual riser cases demonstrating the desirability of feeding different boiling range fractions of gas oil to the two risers. In addition the yields of coke and dry gas, the undesirable by-products of catalytic cracking, are substantially reduced in each of the dual riser runs, also showing the advantages of our invention.

Obviously many modifications and variations of this invention, as hereinbefore set forth, may be made without departing from the spirit and scope thereof. Therefore only such limitations should be imposed as are indicated in the appended claims.

We claim:
1. In a process for the catalytic cracking of a multiplicity of virgin gas oils with a zeolite cracking catalyst in a fluid catalytic cracking unit comprising a reactor, a regenerator and a multiplicity of elongated reaction zones wherein said reactor contains a dense phase and a dilute phase of said catalyst and said elongated reaction zones terminate at said reactor and wherein admixtures of said gas oil and said catalyst are passed through said elongated reaction zones under catalytic cracking conditions to said reactor, the improvement which comprises:
   a. passing through a first elongated reaction zone a virgin gas oil having a boiling range between 600° and 1050° F.,
   b. passing through a second elongated reaction zone a virgin gas oil having a boiling range between 430 and 750° F., said gas oil of step (a) having a higher boiling range than the gas oil of step (b),
   c. adjusting the catalytic cracking conditions in said first elongated reaction zone and said second elongated reaction zone to maintain the conversion of said higher boiling gas oil 0–30 volume percent lower than the conversion of said lower boiling gas oil,
   d. discharging the effluent from said elongated reaction zones into a catalyst phase in said reactor, said effluent comprising vaporous reaction mixture and catalyst, and
   e. recovering from said reactor, as a product therefrom, naphtha having a higher octane rating and at a higher yield than if said lower boiling gas oil and said higher boiling gas oil were combined and catalytically cracked with a zeolite cracking catalyst in an elongated reaction zone at substantially the same overall conversion obtained in said first and second elongated reaction zones.

2. A process according to claim 1 wherein the operating conditions in the first elongated reaction zone comprise a temperature of 800°–1150° F, a weight hourly space velocity of 50–200 w/hr/w and a conversion of 30 to 80 volume per cent, and the operating conditions in the second elongated reaction zone comprise a temperature of 800–1150° F, a weight hourly space velocity of 10–100 w/hr/w, and a conversion of 30 to 80 volume per cent.

3. A process according to claim 2 wherein the effluents from the first and second elongated reaction zones are discharged into a dilute phase of catalyst.

4. A process according to claim 2, wherein the effluent from the first elongated reaction zone is discharged into a dilute phase of catalyst, the effluent from the second elongated zone is discharged into a dense phase of catalyst, and said vaporous reaction mixture from said second elongated reaction zone passes through said dense phase of catalyst under catalytic cracking conditions effecting an additional per pass conversion of 5 to 30 volume per cent, the per pass conversion of the lower boiling gas oil not exceeding 80 volume percent.

5. A process according to claim 2 wherein the effluent from the second elongated reaction zone is discharged into a dilute phase of catalyst, the effluent from the first elongated reaction zone is discharged into a dense phase of catalyst and said vaporous reaction mixture from said first elongated reaction zone passes through said dense phase under catalytic cracking conditions effecting an additional conversion of 5 to 30 volume percent, the per pass conversion of the higher boiling gas oil not exceeding 80 volume percent.

6. A process according to claim 2 wherein the effluents from the first and second elongated reaction zones are discharged into a dense phase of catalyst and the vaporous reaction mixtures from said first and said second elongated reaction zones pass through said dense phase under catalytic cracking conditions effecting an additional conversion of 5 to 30 volume percent, the overall per pass conversion of the lower boling and the higher boiling gas oil not exceeding 80 volume percent.

7. A process according to claim 2 wherein the per pass conversion of the higher boiling gas oil is 10 to 20 percent lower than the lower boiling gas oil.

8. A process according to claim 7 where the operating conditions in he first elongated reaction zone comprise a temperature of 840°–1000° F, a weight hourly space velocity of 75–150 w/hr/w and a conversion of 40–75 volume percent and the operating conditions in the second elongated reaction zone comprise a temperature of 840°–1000° F, a weight hourly space velocity of 40–90 w/hr/w and a conversion of 40–72 volume percent.

9. A process according to claim 7 wherein the gas oil is selected from the group consisting of heavy atmospheric gas oil, light vacuum gas oil, heavy vacuum gas oil, visbroken gas oil, deasphalted gas oil, decarbonized gas oil, hydrotreated gas oil and solvent extracted gas oil.

10. A process according to claim 7 wherein the boiling range of the lower boiling gas oil is about 430° to 750° F and the boiling range of the higher boiling gas oil is about 700° to 1050° F.

11. A process according to claim 1 wherein the zeolite cracking catalyst comprises crystalline alumino-silicate and silica-alumina.

* * * * *